United States Patent [19]

Mayfield

[11] 3,927,584
[45] Dec. 23, 1975

[54] PIPE END FACING AND GROOVING MACHINE

[76] Inventor: Johnny W. Mayfield, 4505 Greenstone Road, Placerville, Calif. 95667

[22] Filed: Mar. 5, 1975

[21] Appl. No.: 555,345

[52] U.S. Cl. ................................................. 82/4 C
[51] Int. Cl.² .......................................... B23B 3/22
[58] Field of Search .................................. 82/4 C

[56] References Cited
UNITED STATES PATENTS

| | | | |
|---|---|---|---|
| 1,099,215 | 6/1914 | Sullivan | 82/4 C X |
| 2,436,152 | 2/1948 | Richards | 82/4 C X |
| 2,842,238 | 7/1958 | Shaw et al. | 82/4 C X |
| 3,202,190 | 8/1965 | Gill | 82/4 C X |
| 3,772,944 | 11/1973 | Becker et al. | 82/4 C |

*Primary Examiner*—Harrison L. Hinson
*Attorney, Agent, or Firm*—Blair & Brown

[57] ABSTRACT

A pipe facing and grooving tool for providing a square face on the end of a length of pipe and an external annular groove to receive a pipe coupling element when coupling lengths of pipe together. The machine includes a motor driven tool carrier journalled on an axially expanding pipe clamping mandrel. Two separate tools on the tool carrier are provided for dressing the end of the pipe and/or removing a bevel from the end of the pipe and for cutting an annular groove of uniform depth in the outer surface of the pipe adjacent the dressed end.

5 Claims, 5 Drawing Figures

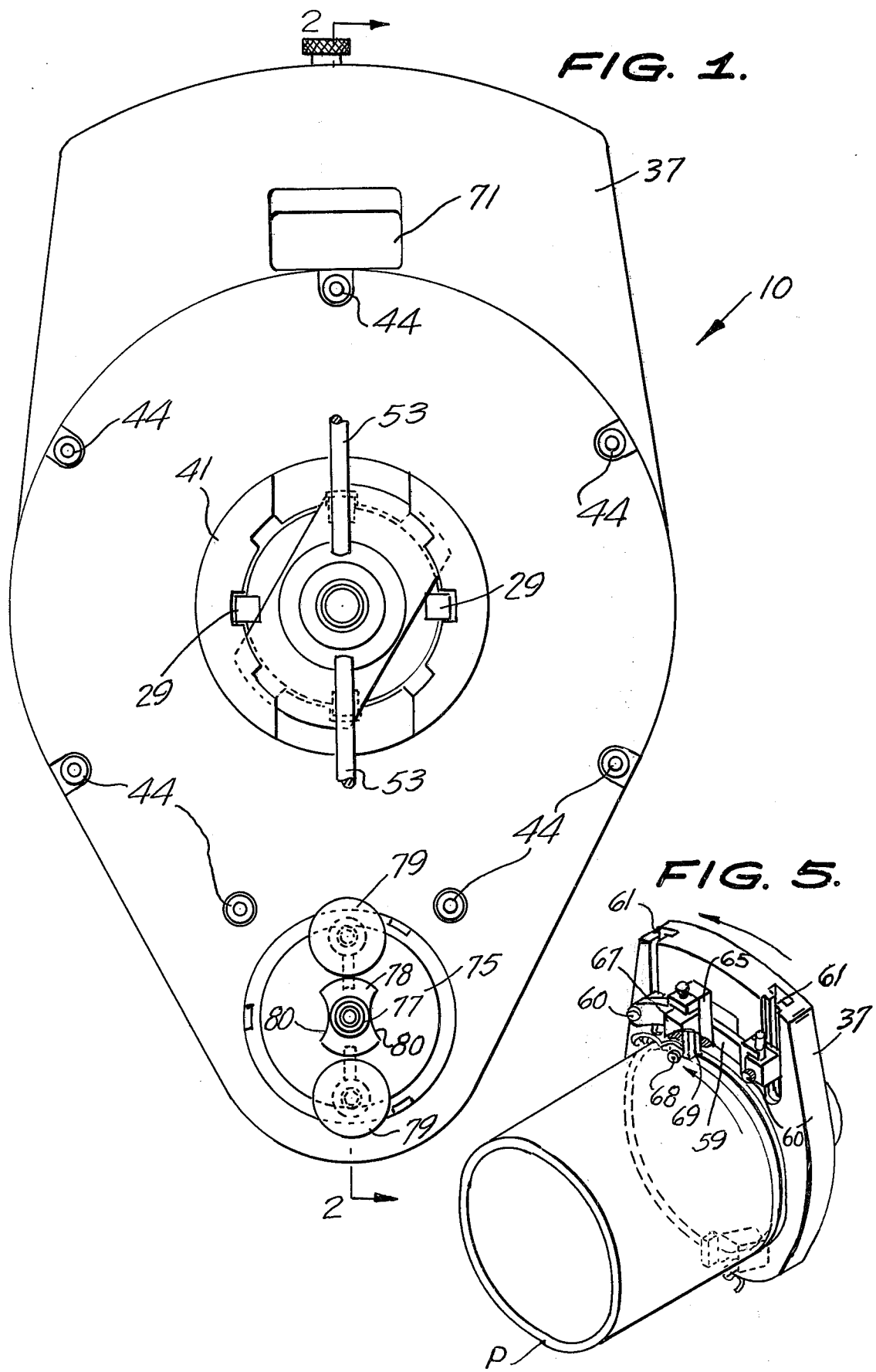

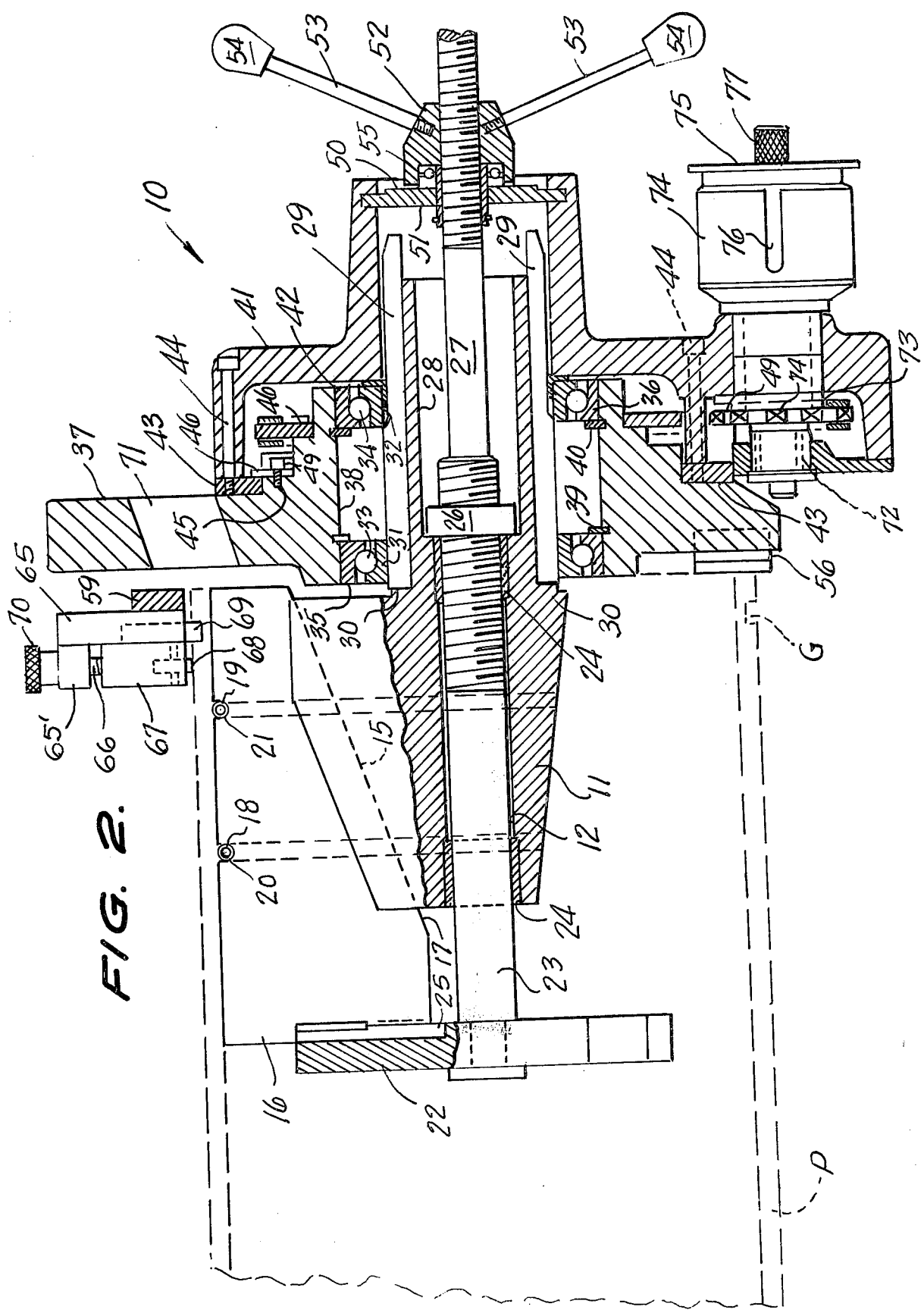

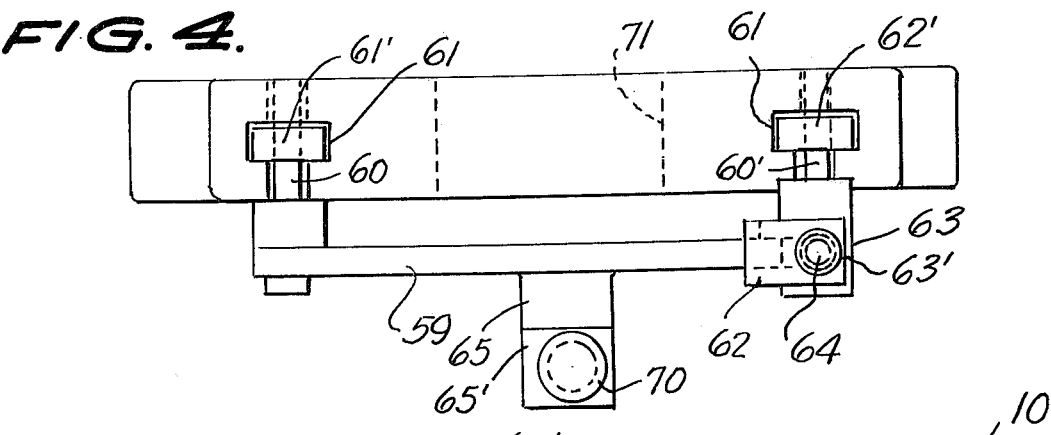
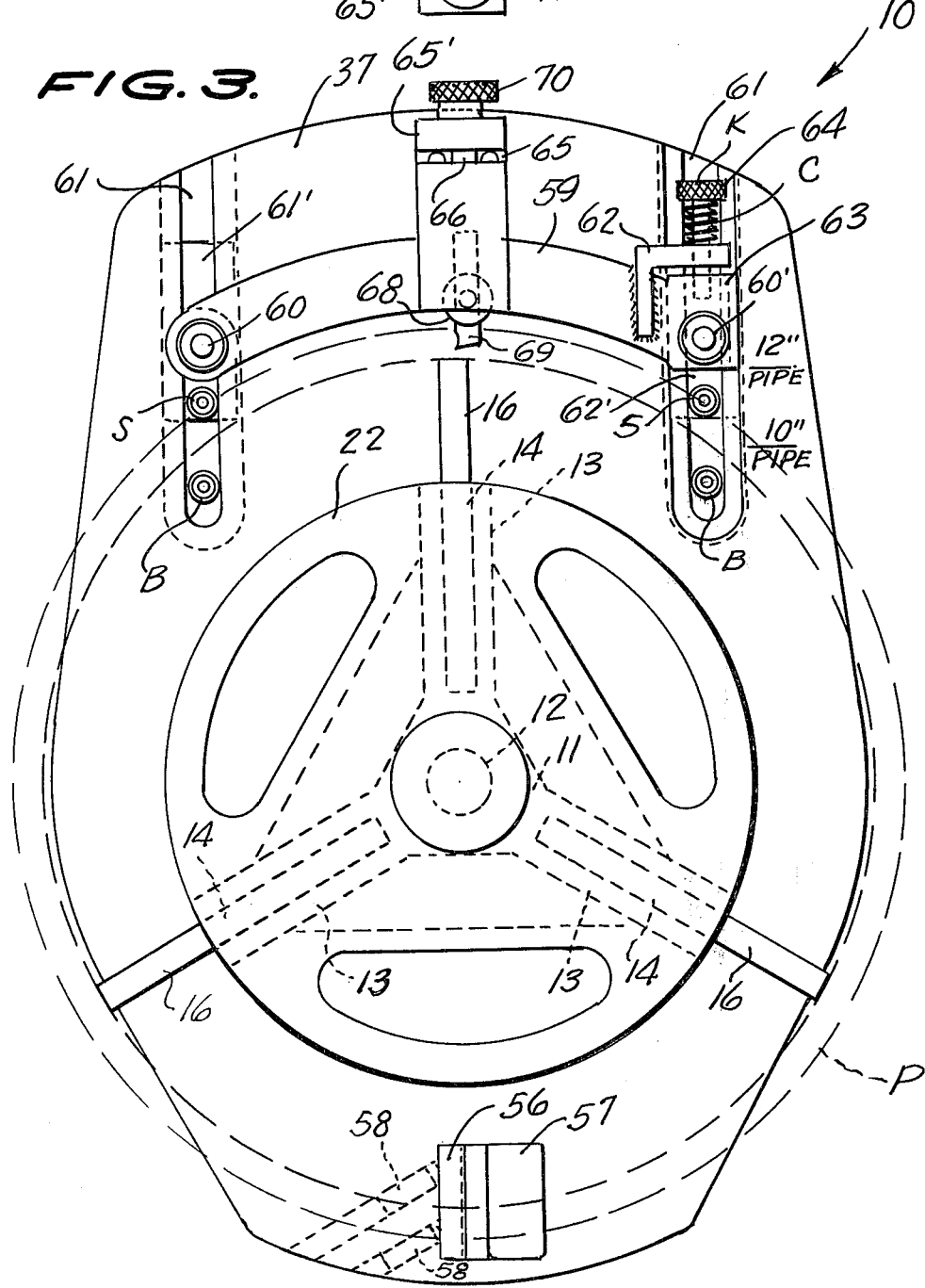

3,927,584

PIPE END FACING AND GROOVING MACHINE

BACKGROUND OF THE INVENTION

Field of the Invention

The present invention relates to a pipe end dressing and grooving machine.

SUMMARY OF THE INVENTION

The present invention is directed to a pipe end dressing and grooving machine in which a tool carrier is mounted for rotation on an axially expanding mandrel which engages in the end of the pipe and the tool carrier is driven by a motor drive. A pipe end dressing tool is mounted on the tool carrier for dressing the end of the pipe and/or removing the bevel already applied thereto. A pipe grooving tool also mounted on the tool carrier is adapted to cut a groove of uniform depth in the outer surface of the pipe adjacent the end thereof with the groove receiving one portion of a removeable pipe coupling.

The primary object of the invention is to provide a tool for dressing and grooving pipe ends in the field to provide an accurate leak proof coupling between adjacent pipe ends.

Other objects and advantages will become apparent in the following specification when considered in light of the attached drawings.

BRIEF DESCRIPTION OF THE DRAWINGS

FIG. 1 is an end elevation of the invention;

FIG. 2 is a vertical sectional view, taken along the line 2—2 of FIG. 1, looking in the direction of the arrows;

FIG. 3 is an end elevation of the invention from the end opposite FIG. 1;

FIG. 4 is a top plan view of the tool support; and

FIG. 5 is a perspective view of the machine in operation.

DESCRIPTION OF THE PREFERRED EMBODIMENT

Referring now to the drawings in detail wherein like reference characters indicate like parts throughout the several figures the reference numeral 10 indicates generally a pipe end dressing and grooving machine constructed in accordance with the invention.

The machine 10 includes a mandrel body 11 having an axial bore 12 extending therethrough. The mandrel body 11 has three circumferentially equi-spaced radially extending members 13 integrally formed thereon. Each of the members 13 has a central slot 14 formed therein with the bottom edge 15 of the slot sloping downwardly toward the outer end of the body 11, as can be seen in FIG. 2.

A blade 16 is mounted in each of the slots 14 and has a tapered bottom edge 17 for engaging against the sloping edge 15 of the slots 14. Each of the blades 16 have a pair of notches 18,19 arranged in the outer edge thereof to receive a coil spring 20,21 therein to lock the blades 16 in the grooves 14 of the members 13. A generally circular end plate 22 is mounted on and secured to a threaded shaft 23 journalled on bushings 24 within the bore 12. The end plate 22 has a radially extending groove 25 in the face thereof toward the mandrel body 11 to receive an end edge of each of the blades 16, as can be seen in FIG. 2.

A nut 26 is threaded onto the threaded shaft 23 and is adapted when tightened to draw the threaded shaft 23 through the mandrel body 11 moving the end plate 22 toward the mandrel body 11 to expand the blades 16 radially outwardly into engagement with the inner face of the pipe P to be faced and grooved by the machine 10. A relatively long socket wrench (not shown) is adapted to engage over the shaft 23 for actuating the nut 26.

A reduced diameter threaded shaft extension 27 is integrally formed on the threaded end of the shaft 23. A hollow generally cylindrical extension 28 is integrally formed on the body 11 and extends axially in a direction away from the end plate 22.

A plurality of longitudinally extending keys 29 are mounted in radially extending slots 30 in the tubular extension 28 and support inner races 31,32, of ball bearing 33,34. A facing and grooving plate 37 is provided with an axial bore 38 mounted on the outer races 35,36 of the ball bearings 33,34. Spring washers 39,40 engage the bore 38 and secure the bearings 33,34 in position in the bore 38.

A drive housing 41 is mounted on the keys 29 and is fixed thereto. The drive housing 41 has a radially outwardly extending flange 42 which engages against the inner race 32 of the ball bearings 34. A circumferential ring 43 is secured to the drive housing 41 by a plurality of cap screws 44 as can be seen in FIG. 2. The ring 43 extends radially inwardly into contact with a portion 45 of the plate 37 and is engaged by a ring 46 secured by cap screws 47 to the plate 37.

A sprocket gear 48 is secured to the plate 37 and is adapted to have a sprocket chain 49 trained thereover.

A retainer plate 50 is engaged in one end of the drive housing 41 and has a bore 51 extending therethrough to permit the threaded extension 27 to extend axially therethrough. A nut 52 is threaded onto the threaded extension 27 and is provided with a pair of handles 53 having knobs 54 on their outer end. A thrust bearing 55 is positioned between the nut 52 and the plate 50 to accept the thrust from the nut 52 as the handles 53 are rotated. Movement of the nut 52 on the threaded shaft 27 moves the housing 41 and the plate 37 toward the pipe P as desired.

A cutter blade 56 is mounted in a slot 57 at the lower end of the plate 37 and secured therein by a pair of set screws 58. The cutter 56 is provided for dressing the end of the pipe P to remove a bevel if one be present and provide a square end on the pipe P.

A yoke 59 is positioned parallel to the plate 37 and has one end secured by a pivot bolt 60 to the plate 37. A pair of vertically extending tee shaped slots 61 are arranged in the forward face of the plate 37 and the bolt 60 has an elongate bead 61' which is mounted for vertical movement in one of the slots 61. A spring pressed shot pin S is mounted on the bolt bead 61' and is adapted to releasably engage in a selected one of vertically spaced bores B in the slot 61.

A bolt 60' has an elongate head 62' which is mounted for vertical adjustment in the second tee slot 61 in the plate 37. A spring pressed slot pin S is mounted on the bolt head 62' and is adapted to releasably engage in a selected one of the vertically spaced bores B in the slot 61. A body 63 is mounted on the bolt 60'.

An L shaped bracket 62 is secured to the end of the yoke 59 opposite the pivot bolt 60 and has a slot 63' formed in the horizontal portion to engage over a pin 64 threaded into the body 63. The pin 64 has a knurled knob K on its upper end and a coil compression spring C is mounted under the knob K around the pin 64 engaging against the top of the bracket 62 to resiliently swing the bracket 62 against the body 63.

The yoke 59 has an outwardly extending cutting tool block 65 mounted thereon including on L shaped member 65' secured rigidly thereto with an adjustment screw 66 threaded downwardly therein. A roller block 67 is mounted for movement radially of the pipe P and is slidably mounted on the cutting tool block 65. A guide wheel 68 is mounted for rotation in the roller block 67 and a cutting tool 69 is also rigidly mounted in the tool block 65 to cut a groove G in the outer surface of the pipe P adjacent one end thereof. A knob 70 on the bolt 66 permits the wheel 68 to be adjusted with respect to the cutter 69 to regulate the depth of cut of the cutter 69. An observation port 71 in the head 37 permits the operator to determine the extent of the cutting that has occured.

A shaft 72 is mounted in the lower end of the housing 41 and has a tubular drive shaft 73 journalled thereon. A sprocket gear 74 is carried by the tubular drive shaft 73 for engaging and driving the chain 49 trained over the sprocket 48. A drive hub 74 is secured to the shaft 73 through a clutch member 75. A slot 76 in the drive hub 74 permits a portable electric drive member to be mounted thereon for rotating the sprocket 74. A knob 77 is connected to the clutch member 75 to rotate a clutch element 78 from a position as illustrated in FIG. 1 where the circular clutch elements 79 are pressed outwardly to a position 90° apart wherein the circular drive members 79 fit into the semi-circular recesses 80 as can be seen in FIG. 1.

In the use and operation of the invention the mandrel body 11 is inserted into the pipe P and secured by tightening the nut 26 to thus force the blades 16 outwardly into engagement with the pipe P. The head 37 and its attached housing 41 are then mounted on the mandrel and the head 37 is fed into the pipe P so as to cut a square face on the end of the pipe P removing the bevel if any be present. The knob 70 is then tightened to bring the cutting bite 69 into groove cutting relation with the outer face of the pipe with the head 37 being rotated through the chain and sprocket drive by a power member (not shown).

The tool 69 is kept in engagement with the pipe P by the spring 64 and the cutter 69 will cut a uniform depth groove G in the pipe P until further cutting is stopped by engagement of the guide wheel 68 with the outer surface of the pipe P. Pipes P which are out of round will be grooved to a uniform depth as will pipes P which are round.

Withdrawal of the shot pin S will release the bolt 60' and the body 63 freeing the yoke 59 thus allowing the cutting tool 69 to move out of the groove cut in the pipe P to thus premit the removal of plate 37 and housing 41.

No vice is required to hold the pipe P since all torque is accepted by the mandrel of the machine.

Having thus described the preferred embodiment of the invention it should be understood that numerous structural modifications and adaptations may be resorted to without departing from the spirit of the invention.

What is claimed is:

1. A pipe end facing and grooving machine comprising a mandrel, means on said mandrel for engaging the inner face of a pipe adjacent one end thereof, a head plate journalled on said mandrel and adapted to rotate thereabout, means connected to said mandrel and engaging said head plate for moving said head plate axially with respect to said mandrel, a power driven hub secured to said last named means, and means extending between said power driven hub and said head for rotating said head from said power driven hub, a facing tool secured to said head adjacent the bottom thereof on the side thereof toward said mandrel for engaging and dressing the end of a pipe, a grooving tool for engaging and cutting a groove in the end portion of said pipe with said tool adjustably mounted on the upper portion of said head and resilient means between said head and said grooving tool for maintaining said tool in contact with the outer face of said pipe.

2. A device as claimed in claim 1 wherein means are provided for moving said tool radially into and out of engagement with said pipe.

3. A device as claimed in claim 2 including a guide wheel for engaging said pipe and limiting the movement of said tool radially inwardly of said pipe.

4. A device as claimed in claim 1 including a observation port formed in said head for observing the cutting action of said machine.

5. A device as claimed in claim 1 including an axially movable head forming part of said mandrel and means for moving said head to adjust the size of said mandrel.

* * * * *